No. 721,842. PATENTED MAR. 3, 1903.
G. F. STEEDMAN.
PRESSURE FLUID FEED FOR SAWMILL CARRIAGES.
APPLICATION FILED MAR. 7, 1901.
NO MODEL. 5 SHEETS—SHEET 1.
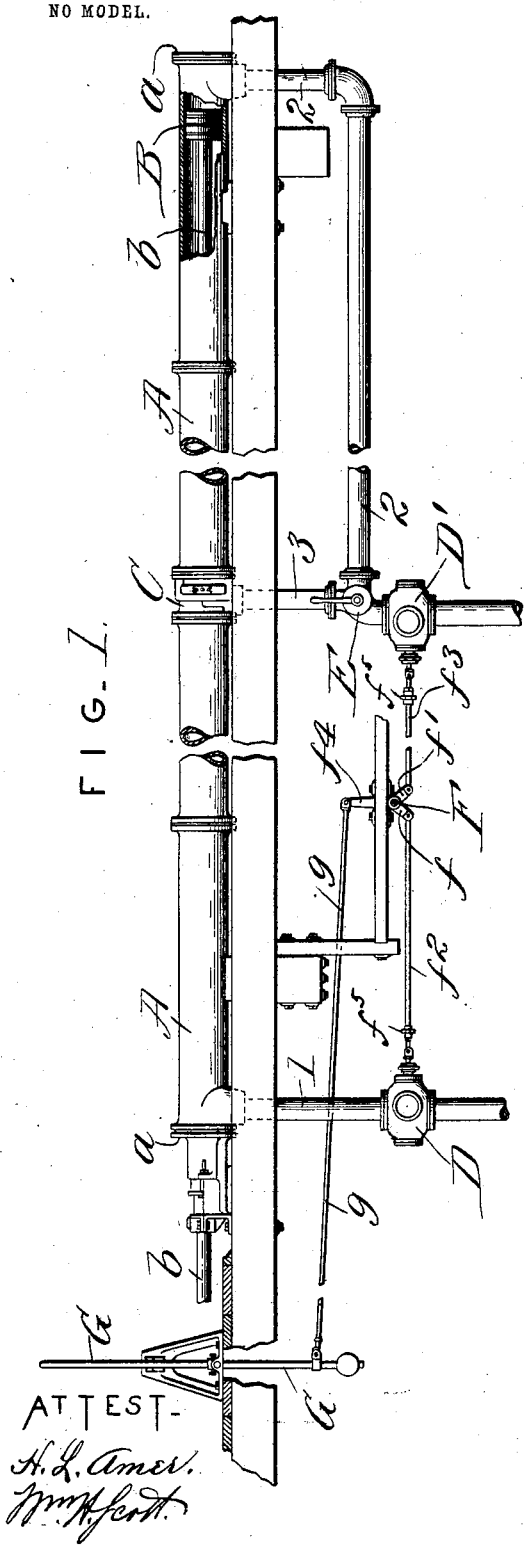
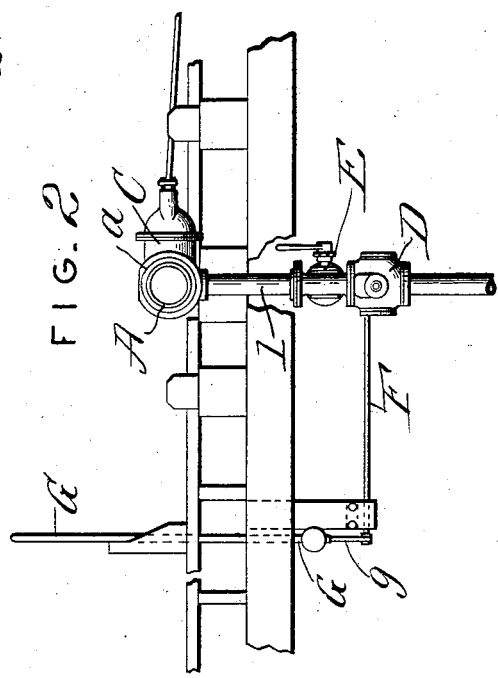
INVENTOR
George F. Steedman,
By Bakewell & Cornwall
Att'ys.
ATTEST
H. L. Ames.
Wm. H. Scott.

No. 721,842. PATENTED MAR. 3, 1903.
G. F. STEEDMAN.
PRESSURE FLUID FEED FOR SAWMILL CARRIAGES.
APPLICATION FILED MAR. 7, 1901.
NO MODEL. 5 SHEETS—SHEET 2.
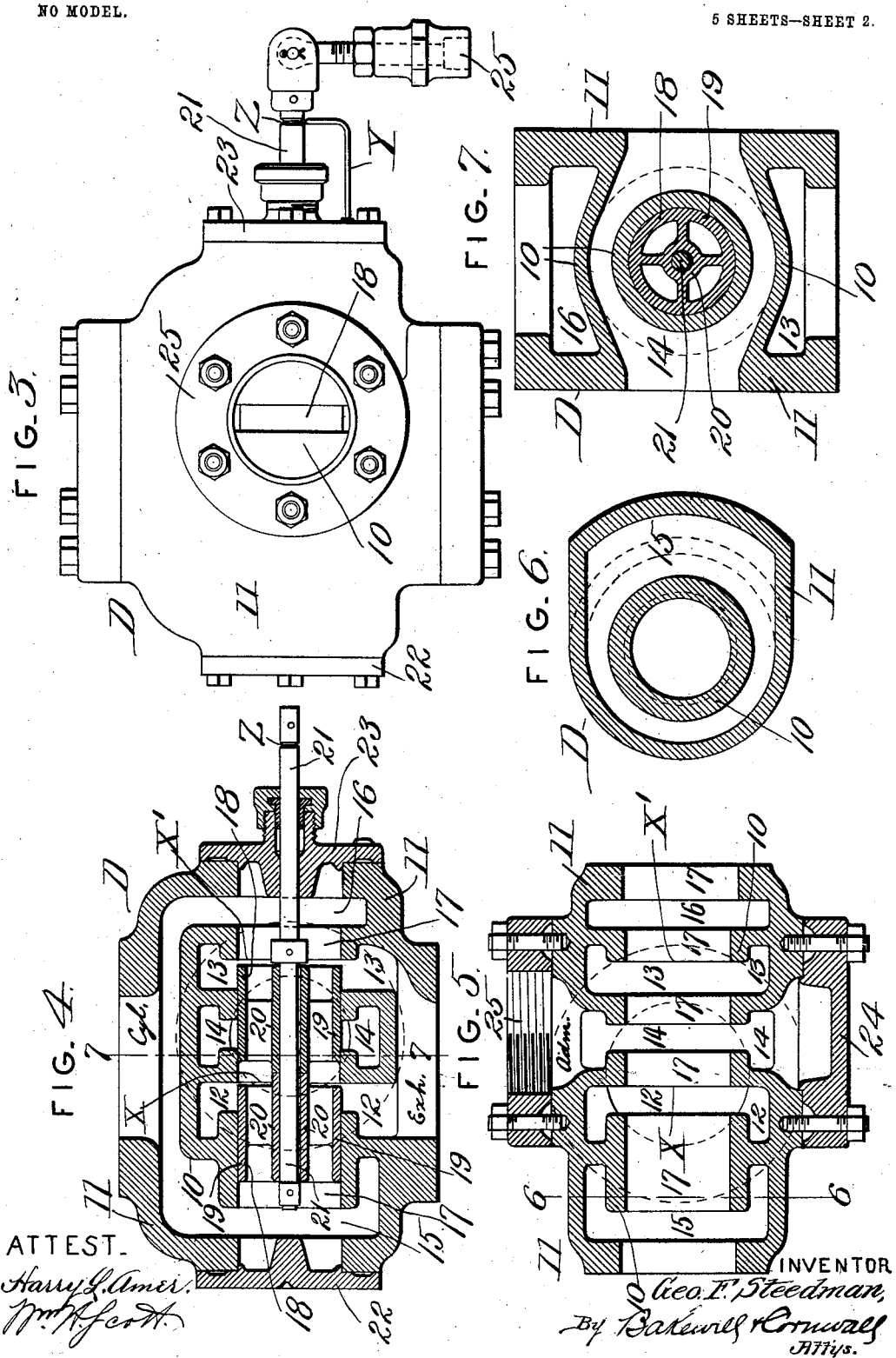

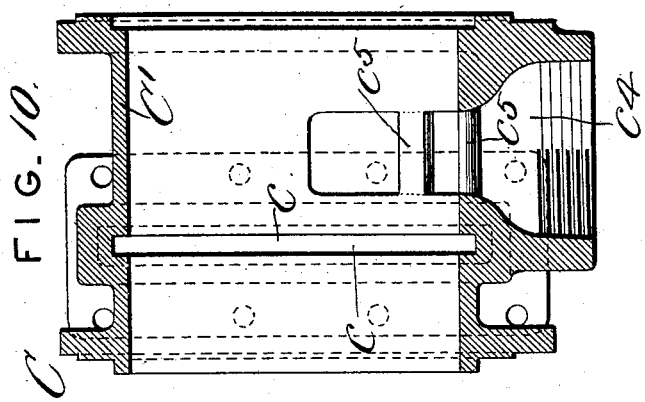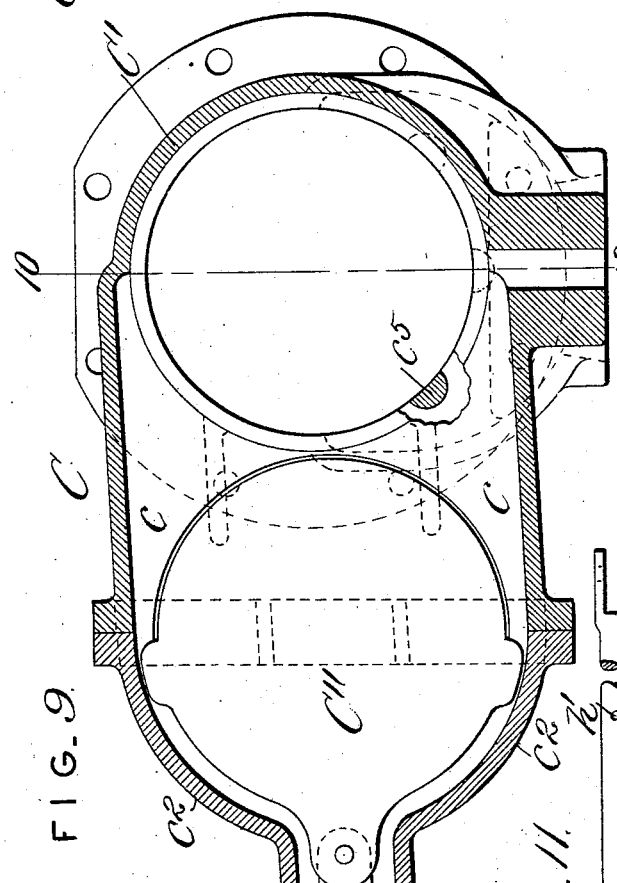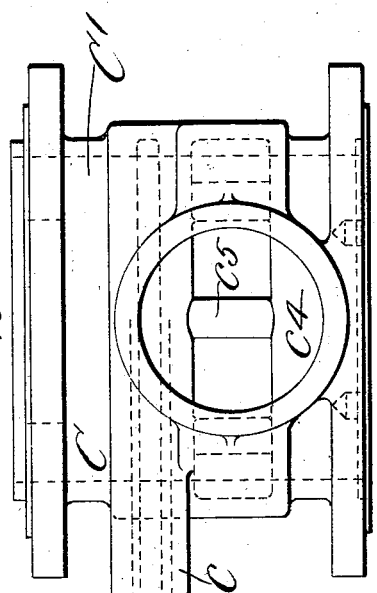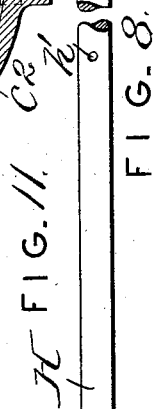

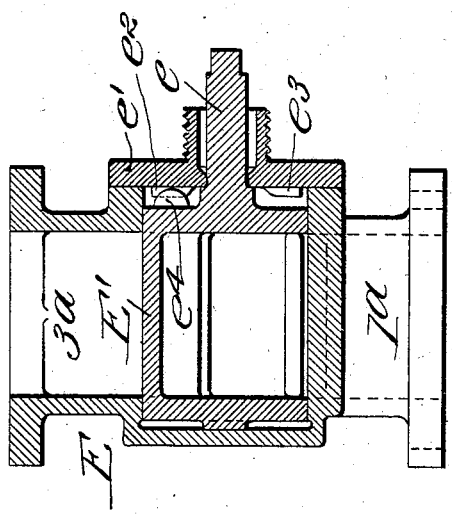
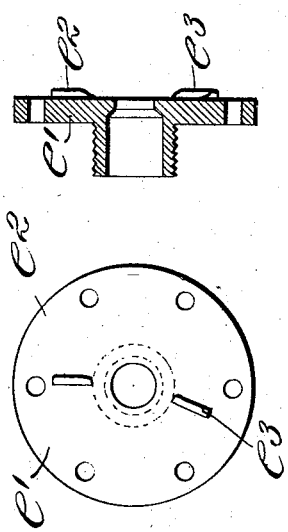
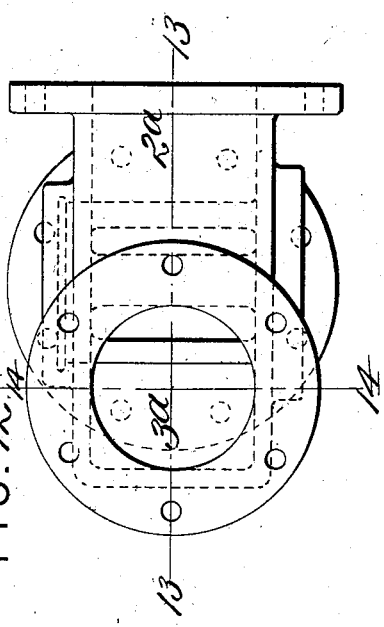

No. 721,842. PATENTED MAR. 3, 1903.
G. F. STEEDMAN.
PRESSURE FLUID FEED FOR SAWMILL CARRIAGES.
APPLICATION FILED MAR. 7, 1901.
NO MODEL. 5 SHEETS—SHEET 5.
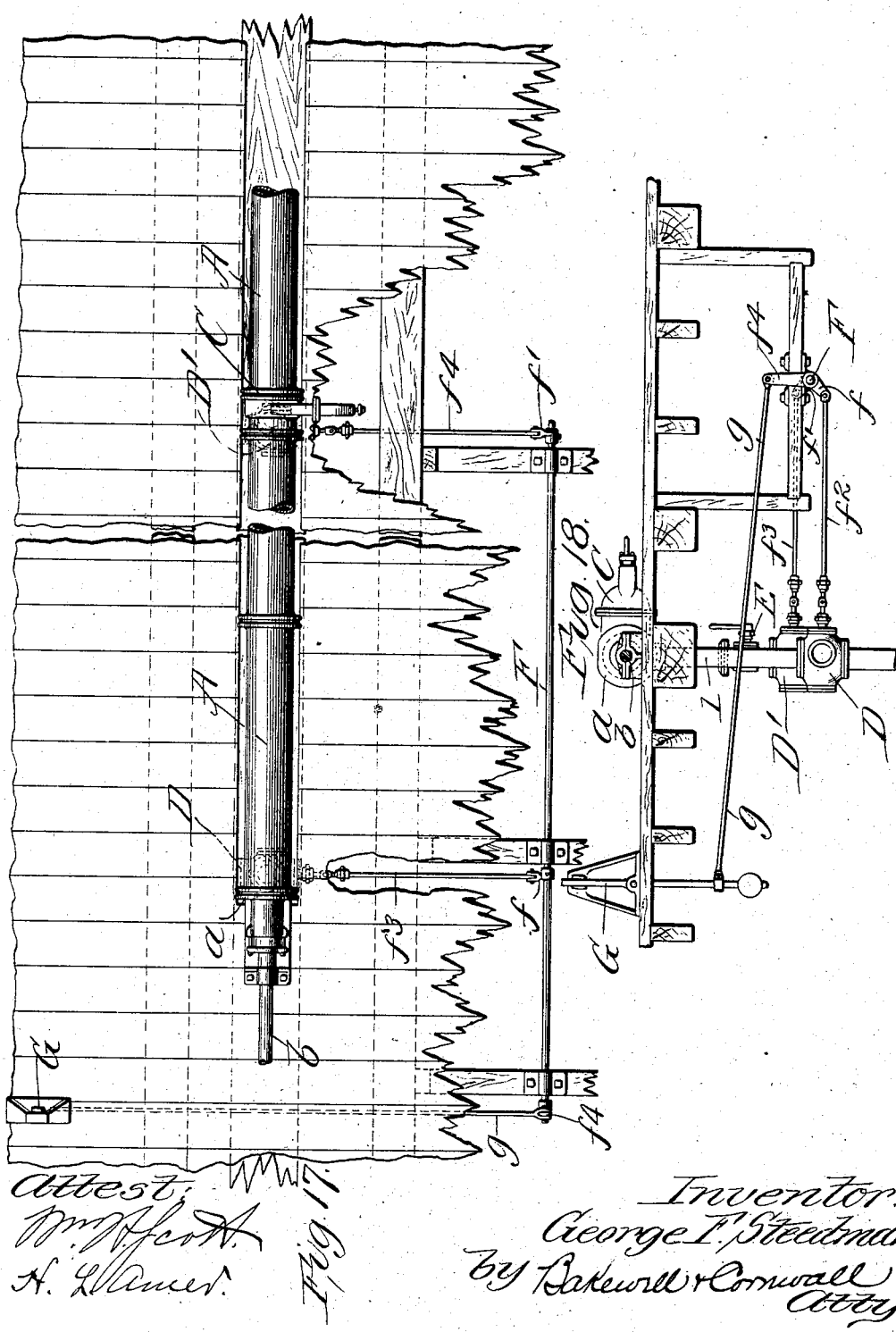

UNITED STATES PATENT OFFICE.

GEORGE F. STEEDMAN, OF ST. LOUIS, MISSOURI.

PRESSURE-FLUID FEED FOR SAWMILL-CARRIAGES.

SPECIFICATION forming part of Letters Patent No. 721,842, dated March 3, 1903.

Application filed March 7, 1901. Serial No. 50,242. (No model.)

*To all whom it may concern:*

Be it known that I, GEORGE F. STEEDMAN, a citizen of the United States, residing at the city of St. Louis, in the State of Missouri, have invented a certain new and useful Improvement in Pressure-Fluid Feed for Sawmill-Carriages, of which the following is a full, clear, and exact description, such as will enable others skilled in the art to which it appertains to make and use the same, reference being had to the accompanying drawings, forming part of this specification, in which—

Figure 1 is a side elevational view of my improved fluid-feed for sawmill-carriages, parts being broken away in order that the invention may be illustrated on a larger scale than would be possible were the entire length of the device illustrated in the given space. Fig. 2 is an end view of the same. Fig. 3 is an enlarged side elevational view of one of the end valves employed in carrying out my invention. Fig. 4 is a vertical longitudinal sectional view of the same. Fig. 5 is a horizontal longitudinal sectional view of the end valve-casing, the valve proper and associate parts being omitted. Fig. 6 is a transverse vertical sectional view of the same, taken on line 6 6, Fig. 5. Fig. 7 is a transverse vertical sectional view of the same, taken on line 7 7, Fig. 4. Fig. 8 is an enlarged plan view of the gate-valve employed in carrying out my invention. Fig. 9 is an enlarged longitudinal vertical sectional view of the same. Fig. 10 is a transverse sectional view of the same, taken on line 10 10, Fig. 9. Fig. 11 is a detail view of the valve-stem employed in the gate-valve. Fig. 12 is an enlarged plan view of the three-way valve employed in carrying out my invention. Fig. 13 is a longitudinal vertical sectional view of the same, taken on line 13 13, Fig. 12. Fig. 14 is a transverse vertical sectional view of the same, taken on line 14 14, Fig. 12. Fig. 15 is an inside face view of the cap-piece and stuffing-box gland employed in the three-way valve. Fig. 16 is a detail sectional view of the same. Fig. 17 is a plan view of my improved fluid-feed for sawmill-carriages, illustrating a modified form of arrangement of the various parts; and Fig. 18 is an end elevational view of the same.

This invention relates to a new and useful improvement in a pressure-fluid feed for sawmill-carriages, and has for its object to produce in a simple and comparatively inexpensive manner a practical device for imparting to a sawmill-carriage a rectilinear reciprocatory motion for carrying and feeding logs to a preferably stationarily mounted saw for cutting the same into lumber.

The essential features of this invention reside, first, in the novel construction and arrangement of the end valves, which coöperate with a cylinder containing a piston for admitting and exhausting pressure fluid to and from said cylinder for obvious reasons; secondly, in the novel means employed for manually operating said end valves; thirdly, in the novel construction and arrangement of the gate-valve employed; fourthly, in the novel construction and arrangement of the three-way valve employed; and, finally, the invention consists in the novel construction and arrangement and combination of the several parts of my device, all as will hereinafter be explained and afterward pointed out in the claims.

The device about to be described pertains to a direct double-acting pressure-fluid cylinder and piston having proper controlling-valves, the same being particularly constructed in such manner as to permit said piston to traverse the entire inner length of its cylinder when desired or to permit said piston to traverse only a portion—say one-half—of the length of its cylinder when desired, which latter operation would be when short lengths of lumber are being operated upon, whereby both pressure fluid and time are utilized to advantage.

I am aware that the broad idea of utilizing all or only a portion of the cylinder for the traverse of its piston for this specific purpose is old and well known, and I do not, therefore, claim this feature broadly. Hence I will confine my description to the novel improvements which I have made in this art.

In the drawings, wherein like characters designate like parts throughout the several views, A indicates a cylinder which is preferably made in flanged sections bolted together in axial alinement with each other, and provided upon the outer end of each outer section is a head $a$.

B indicates a piston which operates in the bore of the cylinder A, and connected to said piston is a piston-rod $b$, which passes through a suitable stuffing-box arranged on one of the cylinder-heads $a$, said piston-rod being designed to connect with a sawmill-carriage (not shown) for well-understood purposes.

C indicates a gate-valve which is arranged in the length of cylinder A, preferably by having the flanged ends of the sections of said cylinder bolted thereto.

1, 2, and 3 indicate pipes which communicate with the bore of cylinder A, the two former being connected one at or near each end of the outer sections thereof, while the latter is arranged intermediate the ends of said cylinder and communicates therewith by entering the gate-valve C, all of said pipes 1, 2, and 3 being attached to the cylinder and gate-valve at the lowermost sides of the same, respectively.

D and D' indicate two valves (hereinafter termed "end valves") which are identical in construction, though so arranged that their valve-stems face each other, the former of said valves being in direct communication with the pipe 1, while the latter is in communication with a three-way valve E, which in turn connects with pipes 2 and 3.

F indicates a rock-shaft upon which is suitably arranged two levers $f$ and $f'$, (or a bell-crank lever, if desired,) which are pivotally connected to rods $f^2$ and $f^3$, in turn pivotally connected to the valve-stems of the end valves D and D', respectively.

G indicates a sawyer's lever which is located in any convenient place, and pivotally connected to one end of said lever is a rod $g$, in turn pivotally connected to an arm or crank $f^4$, secured to rock-shaft F.

Having now given a general description of my improved device, I will proceed to give a detailed description of the three types of valves—viz., end valve, gate-valve, and three-way valve, in the order named—which are employed in carrying out my invention.

The end valve D (and D') is illustrated in Figs. 3 to 7, inclusive, of the drawings, and consists, generally stated, of preferably a cast-metal casing having cored passages, a cylindrical slide-valve and associate parts, and various cap-pieces.

10 indicates what may be termed the "valve-casing" proper, which is arranged within and connected to an outer casing 11, said inner casing 10 being provided with three distinct recesses or ports 12, 13, and 14, the two former being the exhaust-ports, which are connected together and open to the exterior of casing 11 at the bottom thereof, while the latter or port 14 is the admission-port for the pressure fluid and opens to the exterior of casing 11, to one side thereof.

15 and 16 indicate what I will term "cylinder-ports," which are arranged one on either side of the exhaust-ports 12 and 13. In reality these cylinder-ports 15 and 16 are one port or passage which opens to the exterior of casing 11 at its top, or it might be said that said ports 15 and 16 constitute the space which separates the portions of the casings 10 and 11. I have preferred to arrange about centrally of this valve-casing as an entirety a longitudinally-disposed cylindrical bore 17, which passes through the entire casting and which when the valve hereinafter described is not in place in said bore connects or establishes communication between all of the ports 12, 13, 14, 15, and 16.

18 indicates a hollow cylindrical slide-valve which is arranged and snugly fits within bore 17, the same being formed of two identical pieces which consist of a tubular outer portion 19 and a tubular inner portion 20, connected together with suitable webs. This inner tubular portion 20 extends some distance beyond one end of the outer tubular portion 19, and when said extended portions of the valves are toward each other and strung upon and held against independent longitudinal movement on the valve-stem 21 a space is left between the outer tubular portions 18, as is clearly illustrated in Fig. 4. I prefer to form the bore of the inner tubular portion 20 of the slide-valve 18 of slightly-greater diameter than the diameter of the valve-stem 21, which passes therethrough, in order to allow for wear of the valve and its casing or seat, due to their frictional contact one with the other, and whereby said valve can have independent lateral movement relative to its stem, as is obvious.

22 and 23 represent cap-pieces arranged on each end of the valve-casing 11, and these are designed to cover the ends of bore 17, one cap-piece, however, being provided with a bore for the passage of the valve-stem and having a gland for a stuffing-box.

It will be observed from an inspection of Figs. 5 and 7 of the drawings that I have preferred to have the admission-port 14 open to both sides of casing 11 and that in the former figure I have illustrated a cap-piece 24, bolted over one opening, while bolted around the other opening is a screw-threaded ring 25, designed to receive a pipe. My object in this arrangement of having the port 14 open on both sides of casing 11 is to enable me to connect the supply-pipe to either side of said casing, as conditions may require, and obviate the necessity of having to make right and left casings.

Referring again to Fig. 4 of the drawings, it will be observed that valve 18 is shown in its central or intermediate position and that the cylinder-ports 15 and 16 are in communication with the exhaust-ports, which means that pressure fluid has exhausted or may exhaust from cylinder A at both ends when valve D is in a central position, and necessarily valve D' is in the same position in view of the arrangement of the crank-arms on rock-shaft F. When it is desired to drive the piston B in one direction or the other, the sawyer's lever G is moved in the proper direction, which will result in one of the end valves admitting pressure-fluid, while the other end valve will open wide the exhaust. From this central position (illustrated in Fig. 4) if the valve 18 is moved to the right or inwardly, the first material thing accomplished is to cause the outer edges of both of the rings 19 of said valve to move past the edges, which I will designate as X and X', and close all communication between the exhaust-ports and the atmosphere. A continued movement of said valve 18 will then bring the space formed between the tubular portions 19 thereof to aline or communicate with the admission-port 14 and allow pressure fluid to pass therefrom through the space between the tubular portions 19 and 20 of valve 18 into the cylinder-ports 15 and 16 to the cylinder A. When the valve 18 is moved to the left or outwardly from its central position, it will only further open the passage-way from the cylinder-ports to the exhaust-ports and when fully opened will effect a very large exhaust from said cylinder. By connecting the valve-stems of these end valves to the crank-arms $f$ and $f'$, (or a bell-crank lever,) arranged at about the angles shown in the drawings relative to said valves and to the rock-shaft F, to which they are secured, I obtain the quick opening of the exhaust of one valve simultaneously with the slower opening movement of the admission of the other valve, it being understood, however, that there is a sufficient lead of the former over the latter, as is usual. These end valves are practically balanced both in admission and exhaust—that is, the fluid passes through from both ends of the valve proper, and thus tends to balance the same. There is a slight difference in the amount of pressure fluid on each side of the valve proper due to the presence of the valve-stem 21; but this is so slight that I consider it an advantage, as the valve can be felt. However, if desired, the valve-stem 21 can be made to extend outwardly from the other end of the slide-valve and pass into a suitable bore formed in the cap-piece 22 or through a stuffing-box.

It will be observed that the end valves D and D' are so arranged that their valve-stems are in axial alinement with each other and are disposed longitudinally the cylinder A, and it will be understood that when steam is used as the pressure fluid in said cylinder the same will become heated and expand and that its longitudinal expansion will vary with the pressure of steam (the degree of heat) used. Therefore it is necessary to set the valves properly in said end valves D and D' when the cylinder is hot—we will say, for example, 330° of heat. It will be obvious that if the valves are set when the cylinder is cold when the cylinder becomes heated to, say, 330° of heat the valves proper will not correctly register with their controlling-ports. To enable an attendant to quickly adjust these valves proper to their ports, I have arranged between the stems of said valves and the rods $f^2$ and $f^3$ a turnbuckle or nut $f^5$, which can be so manipulated as to move the valves proper longitudinally inwardly or outwardly, as will be understood. In initially setting these valves proper in the end valves D and D', I make a gage, such as Y, (shown in Fig. 3,) and arrange a mark or cut, such as Z, on the valve-stems and set the valves proper to this mark by resting one edge of said gage against the cap-piece 23. The valves are set by this gage when the cylinder is cold and again when heated up to normal temperature of the working steam-pressure.

The gate-valve C is shown in detail in Figs. 8 to 11, inclusive, and consists of a hollow casing C', having a lateral projection $c$ and a cap-piece $c^2$, bolted to the outer end thereof, which cap-piece is provided with a recess which registers with the recess formed in the lateral projecting portion $c$ and in which recess is arranged a slidable valve C''. This slide-valve C'' is designed to cut off or throttle pressure fluid from passing through the main bore of the valve-casing C', which is in axial alinement with the cylinder A and to which valve-casing sections of said cylinder are bolted.

H indicates a valve-stem secured to one edge of the slidable valve C'', which valve-stem passes through a suitable opening formed in the cap-piece $c^2$ and through a suitable stuffing-box carried thereon. In order to positively hold or lock this slidable valve in one or the other of its two extreme positions—viz., open or closed—I have arranged on the cap-piece $c^2$ a projection or angle-shaped bar of metal $c^3$, having an opening formed therein and through which opening the valve-stem H passes. This valve-stem H is provided with two perforations $h$ and $h'$, so located that when said valve-stem and its carried valve is in its outermost position the perforation $h'$ will have passed beyond the projection $c^3$, and when a pin or cotter-key $h^2$ is passed through said perforation $h'$ the valve-stem is prevented from moving inwardly either by accident or design and be in the path of movement of the piston of cylinder A. When the valve is in its extreme innermost or closed position, the perforation $h$ is just past the inner edge of projection $c^3$ and is ready to receive the pin or cotter-key $h^2$ to lock said rod and valve in its home position.

Arranged in the bottom edge of the valve-casing and in communication with the main bore thereof, but to one side of the slide-valve C'', is a passage-way $c^4$, which is designed to conduct pressure fluid to said main bore when desired. Into this passage-way $c^4$ leads the pipe 3 from the three-way valve E. The opening formed by the communication of the main bore of casing C' and the passage-way $c^4$ is preferably of rectangular shape when seen in plan view and has its longest dimension disposed transversely to the main bore of said casing C', and arranged across this opening are a plurality of connecting-bars $c^5$, whose upper faces are flush with said main bore, or the upper faces of these bars $c^5$ are in reality a continuation of the lower wall of said main bore across said opening. The purpose of arranging these bars $a^5$ across the opening referred to is to prevent the packing-rings carried by piston B, which when the entire stroke of said piston in cylinder A is used passes through the main bore of casing C', from expanding when reaching said opening and be caught by the edges thereof, as will be understood. The recess formed around the main bore of casing C' for receiving the slide-valve C'' is sufficiently narrow to permit the packing-rings of piston B to pass thereover. Consequently no damage can be done thereby.

The three-way valve E is in its essential features of the ordinary construction, inasmuch as it is a casting provided with one cylindrical bore, into which three ports or channels open and in which is closely fitted a rockable plug E' of such construction that it can bring into registration through its own port any two, but never all three, of the ports or channels with which it coöperates. For the sake of reference I will give these ports or channels the following numbers, $1^a$, $2^a$, and $3^a$, the first being the one which connects with the cylinder-port of valve D', the second the one which is connected to pipe 2, and the third the one which connects to pipe 3. This rocking plug E' is provided with a suitable stem $e$, which passes through a cap-piece and stuffing-box $e'$, which latter is bolted or otherwise secured to the valve-casing and is provided with two stops or projections $e^2$ and $e^3$, which are engaged by a projection $e^4$, formed on one face of the plug E', and by which the same is so limited in its movement as to cause in either of its extreme positions a proper registration with the desired passage-ways which it controls.

The operation of my improved device is as follows: When it is desired to have the piston B traverse the entire length of cylinder A, the gate-valve C is opened and the three-way valve E so moved as to close passage-way $3^a$ and establish communication between passage-ways $1^a$ and $2^a$. The sawyer's lever is now moved in one direction or the other, depending upon the direction it is intended the piston B should move, which action will admit pressure fluid through one end valve to cylinder A at one side of said piston and simultaneously therewith permit that end of cylinder A at the opposite side of said piston to communicate with the atmosphere or exhaust through the other end valve. When it is desired to move piston B forwardly or to the left from its position shown in Fig. 1, the sawyer's lever is moved to the left, which movement effects an exhaust from the left-hand end of cylinder A through end valve D and simultaneously therewith causes the end valve D' to permit pressure fluid to pass therethrough, through the ports $1^a$ and $2^a$ of the three-way valve, and through pipe 2 to the right-hand end of cylinder A. When it is desired to move the piston B to the right or backwardly, the sawyer's lever is moved to the right, which will obviously cause the end valve D to admit pressure fluid to the cylinder and simultaneously therewith cause the end valve D' to effect, through the pipe 2 and the three-way valve, an exhaust. When it is desired to use only one-half of cylinder A, or, in other words, permit the piston contained therein to traverse only the forward half of said cylinder, the gate-valve C is closed and the three-way valve E so turned as to cause its ports $1^a$ and $3^a$ to register and its port $2^a$ to close, shutting off pipe 2, whereupon it will be seen that when pressure fluid is admitted or exhausted through said end valve D it will pass through the three-way valve and pipe 3 to or from the cylinder A, as the case may be.

In Figs. 17 and 18 I have illustrated a slightly-modified form of arrangement of the end valves D and D' and their operable mechanism, wherein it will be seen that I have arranged said end valves D and D' with their valve-stems disposed transversely the axis of cylinder A and have arranged the rock-shaft F in longitudinal relation or parallel with said cylinder. The rock-shaft is provided with the crank arms or levers $f$ and $f'$ and $f^4$ and their connections to their respective valve-stems and sawyer's lever in substantially the same manner as described in the construction shown in Figs. 1 and 2. The object in this arrangement of parts is to prevent the expansion and contraction of cylinder A from affecting the valves proper in the end valves D and D' and causing them to become out of correct relation to the various ports which they control, and thereby obviate the necessity of having to aline said valves to their proper relation to these ports when different pressures of steam are being used, as would have to be done in the construction illustrated in Figs. 1 and 2.

In the following claims I have referred to the end valves as being similar in construction. These valves, as shown in the drawings, are duplicates of each other, being made from the same pattern. This is an advantage, in that the manufacturer may supply one or a pair of valves without being compelled to discriminate between right and left. So far as I am aware I am the first to make end valves identical in construction, which end valves may be employed at either end of the cylinder; but I do not wish to be understood as limiting my claims to end valves which are exactly identical in construction, as said valves might differ in minor details as regards the ends of the cylinder to which they are designed to be applied without in the least departing from the nature and principle of my invention.

Having thus described my invention, what I claim, and desire to secure by Letters Patent, is—

1. In a device of the character described, the following elements in combination; a cylinder and its piston, a gate-valve arranged in the length of said cylinder, pipes for admitting or exhausting pressure to and from said cylinder, a pipe communicating with said gate-valve for admitting or exhausting pressure fluid therefrom, a three-way valve for directing pressure fluid to or from one end of said cylinder or to or from said gate-valve, through their respective pipes, an end valve which permits pressure fluid to pass through said three-way valve in its passage to or from said cylinder or said gate-valve, an end valve which permits pressure to pass to or from the other end of said cylinder through its pipe, and means for operating said end valves to cause them to respectively admit and exhaust pressure fluid; substantially as described.

2. In a device of the character described, the combination with a gate-valve, of a cylinder arranged on each side thereof, pipes 1, 2 and 3 which communicate with the said two cylinders and said gate-valve respectively, at their lower sides, an end valve into which pipe 1 leads, a three-way valve into which pipes 2 and 3 lead, an end valve which communicates with said three-way valve, a rock-shaft, means actuated by said rock-shaft for operating said end valves, and means for rocking said shaft; substantially as described.

3. In a device of the character described, the combination with a cylinder and its piston, of a gate-valve arranged in the length of said cylinder, a pipe 3 which leads into said gate-valve at its lowest side, pipes 1 and 2 which lead into the outer ends of said cylinder at its lowest side, a manually-operable three-way valve with which pipes 2 and 3 communicate, an end valve which communicates with said three-way valve, an end valve similar in construction to said first-mentioned end valve, which communicates with said pipe 1, and connections between said end valves for causing the same to respectively admit and exhaust; substantially as described.

4. In a pressure-fluid feed for the purpose specified, the combination with a cylinder, of a gate-valve, a three-way valve, two similarly-constructed end valves, a pipe connection between one end valve and one end of said cylinder, a pipe connection between the other end of said cylinder and one branch of said three-way valve, a pipe connection between said gate-valve and another branch of said three-way valve, communication between the other end valve and the third branch of said three-way valve, means for operating said end valves so that one will admit and the other exhaust pressure fluid, said means being so arranged that the expansion or contraction of said cylinder will not affect the proper opening or closing of said end valves; substantially as described.

5. In a pressure-fluid feed, the combination with a cylinder and its piston, of two similarly-constructed end valves, port connections between said end valves and said cylinder, said valves being also provided with exhaust-passages, means for operating said end valves at different speeds whereby pressure is gradually admitted by one of said valves to one end of the cylinder, while pressure at the other end of the cylinder is quickly exhausted by the other of said valves, and means whereby said operating means will, in its movements in both directions, fully open the outlet-port at one end of the cylinder in advance of the opening of the inlet-port at the other end of the cylinder, the continued movement of said operating means serving to fully open said inlet-port; substantially as described.

6. In a pressure-fluid feed, the combination with a cylinder and its piston, of two similarly-constructed end valves which are reversible in their movement and action, connections between said valves and said cylinder, said valves being provided with exhaust-openings, and a bell-crank lever connected to said valves, whereby in the movement of said lever in either direction the exhaust-opening of one of said valves is fully opened before the inlet of the other of said valves is fully opened, and continued movement of said lever serves to fully open said inlet; substantially as described.

7. In a pressure-fluid feed, a sectional cylinder, one of said sections forming a gate-valve casing having ports substantially corresponding to the chamber of said cylinder, said section being provided with a port in its wall, and a gate-valve arranged in said casing; substantially as described.

8. In a pressure-fluid feed, a sectional cylinder, one of said sections having a port opening upon its inner circumference, a hollow, laterally-extending portion arranged to one side of said port, and a slide-valve operable in the recess of said laterally-extending portion; substantially as described.

9. In a pressure-fluid feed, a sectional cylinder, one of said sections having a port opening upon its inner circumference, a hollow, laterally-extending portion arranged to one side of said port, a slide-valve operable in the recess of said laterally-extending portion, and means for locking said slide-valve in either its inner or outer position; substantially as described.

10. In a pressure-fluid feed, a sectional cylinder, one of said sections having a port opening upon its inner circumference, a hollow, laterally-extending portion arranged to one side of said port, a slide-valve operable in the recess of said laterally-extending portion, a valve-stem connected to said slide-valve, a projection having a perforation arranged on said lateral projection and through which perforation said valve-stem passes, said valve-stem being provided with two perforations which aline with the inner and outer sides of said projection having the perforation through which said valve-stem passes when said slide-valve is in its outer and inner positions respectively, and a pin coöperating with said perforations in said valve-stem for locking the same; substantially as described.

In testimony whereof I hereunto affix my signature, in the presence of two witnesses, this 5th day of March, 1901.

GEORGE F. STEEDMAN.

Witnesses:
GEORGE BAKEWELL,
HARRY L. AMER.